(12) United States Patent
Blankenship et al.

(10) Patent No.: US 6,371,701 B1
(45) Date of Patent: Apr. 16, 2002

(54) APPARATUS HAVING A CONTROLLABLE DWELL AND ASSOCIATED METHOD

(75) Inventors: Thomas O. Blankenship, St. Charles; David L. Fritsche, Foristell; James L. Morrison, O'Fallon; Brian J. Martinek, Troy; Daniel C. King, Ballwin, all of MO (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/520,315

(22) Filed: Mar. 7, 2000

(51) Int. Cl.$^7$ .............................................. B23B 47/18
(52) U.S. Cl. ........................ 408/14; 408/14; 408/1 R; 408/17; 408/95; 408/97
(58) Field of Search ........................ 408/1 R, 17, 14, 408/95, 97, 130

(56) References Cited

U.S. PATENT DOCUMENTS

| | | | | |
|---|---|---|---|---|
| 3,861,817 A | * | 1/1975 | Muller | ........................ 408/1 |
| 4,198,180 A | | 4/1980 | Schultz | |
| 4,310,269 A | * | 1/1982 | Neu et al. | ...................... 408/11 |
| 4,351,467 A | * | 9/1982 | White | ........................ 408/14 |
| 4,453,868 A | | 6/1984 | Winslow | |
| 4,545,706 A | * | 10/1985 | Hiroyasu et al. | ........... 408/130 |
| 5,001,827 A | * | 3/1991 | Nakagawa | ................... 408/1 R |
| 5,022,800 A | | 6/1991 | Vindez | |
| 5,161,921 A | * | 11/1992 | Corsi | ......................... 408/1 R |
| 5,658,102 A | * | 8/1997 | Gale | ........................... 408/1 R |
| 5,775,853 A | * | 7/1998 | Keefer et al. | ............... 408/1 R |
| 6,176,650 B1 | * | 1/2001 | Rottler et al. | ............... 408/1 R |

* cited by examiner

Primary Examiner—Henry Tsai
Assistant Examiner—Terrence Washington
(74) Attorney, Agent, or Firm—Alston & Bird LLP (57) ABSTRACT

An apparatus having a controllable dwell for drilling and or countersinking a hole in a workpiece is provided which generally comprises a feed mechanism, a retraction mechanism, and a dwell mechanism. The feed mechanism is configured to feed a spindle from a starting position to a predetermined feed limit during a feed cycle. The retraction mechanism is configured to retract the spindle from the feed limit to the starting position to complete the feed cycle. The dwell mechanism is in communication with the retraction mechanism and comprises a mechanical bias member that stores energy during at least a portion of the feed cycle, wherein the mechanical bias member releases at least a portion of the energy once the spindle reaches the feed limit. The retraction mechanism is only actuated once the spindle reaches the feed limit and the mechanical bias member releases at least a portion of the energy. A predetermined dwell period is thereby provided between the spindle reaching the feed limit and the retraction mechanism being actuated. An associated method is also provided.

22 Claims, 5 Drawing Sheets

APPARATUS HAVING A CONTROLLABLE DWELL AND ASSOCIATED METHOD

FIELD OF THE INVENTION

The present invention relates to an apparatus having a controllable dwell and, more particularly, to a drilling apparatus having an adjustable dwell mechanism and associated method.

BACKGROUND OF THE INVENTION

The production of components of an assembly, for example, airplane structural components, often requires that holes be drilled in the components to accommodate the fasteners that secure the assembly together. In some instances, the drilled holes may also need to be countersunk. Typically, the countersink has a preferred depth where the diameter of the countersink is matched to the fastener being used. If the countersink is not deep enough, the fastener may protrude outwardly of the component surface. If the countersink is too deep, particularly in a thin-section component, the hole associated with the countersink may be unacceptably large, the structural strength of the component may be adversely affected, and the fastener may not be able to securely fasten the component. In addition, the excess countersink depth, after the fastener has been installed, will define a cavity which may undesirably collect debris or disrupt airflow about the component. Further, since these components are generally fabricated in a manufacturing operation, where multiple holes must be drilled and countersunk in one or more components, consistency of the countersink depth is also typically required.

In some manufacturing operations, drilling and/or countersinking processes may be performed with, for example, portable pneumatic power feed equipment. In these situations, a pneumatic drill motor is used to turn a cutter while a feed mechanism feeds and retracts the cutter over a predetermined distance. The relative positioning of the component or workpiece with respect to the travel of the cutter determines the depth of the hole and or countersink. In practice, the power feed equipment must also incorporate a dwell into the feed/retract cycle of the cutter when the cutter is at the feed limit and before it is retracted. The dwell, or pause in the feed cycle at the feed limit, facilitates consistency in the countersink diameter by allowing a period for the cutter to clean up the countersink surface by removing any extraneous material from the countersink. The dwell also allows a flexible workpiece or other flexible components of the power feed equipment to spring back to their original shape if deformed by the feed force exerted by the feed mechanism feeding the cutter. Thus, obtaining a consistent countersink diameter within specified tolerances using pneumatic power feed equipment generally requires a controllable dwell that is both adjustable and consistently repeatable.

Some typical pneumatic countersinking or drilling/countersinking equipment combine dwell and automatic retract features into the same mechanism. For example, in one instance, a microstop-type adjustable stop is used to control the closing of an air vent port at a point in the cutter feed cycle. The air vent port is generally configured to vent air from a pressurized air source that is also connected to the retract mechanism. As the cutter reaches the feed limit during the feed cycle, the vent port is sealed which causes back-pressure to accumulate. Once the back-pressure reaches a threshold pressure, a spool valve in the retract mechanism is shifted and thereby actuates the retract portion of the feed cycle. In some instances, an adjustable needle valve is included in the dwell and automatic retract mechanism for controlling the amount of air flowing out through the vent port and thereby providing the dwell portion of the mechanism. Generally, an increased restriction of the air flow out through the vent port by the needle valve will result in an increased time between the vent port being sealed and the back-pressure reaching the threshold pressure, thereby providing a dwell between the cutter reaching the feed limit and the spool valve shifting to actuate the retract portion of the feed cycle.

However, this dwell and automatic retraction mechanism may produce unacceptable variances in the amount of dwell between cutter feed cycles. For example, one of the factors affecting the dwell is the relative friction between the spool valve and the bore housing the spool valve. Generally, as the friction between the spool valve and its bore increases, the dwell will also increase for a given dwell adjustment of the needle valve. This friction may further depend on, for instance, the lubrication between the spool valve and the bore or the amount of moisture or particulates in the air supply. These factors, along with the air supply pressure, may vary greatly and frequently in a typical manufacturing environment. Fluctuations in the air pressure will also cause the dwell to vary for a given dwell adjustment of the needle valve.

Another factor possibly adversely affecting the consistency of the dwell is the configuration of the dwell portion of the mechanism. The needle valve controlling the amount of air flowing through the vent port typically comprises a relatively small passage for transporting the air from the air supply. Thus, the needle valve may be sensitive to particulates in the air supply which will tend to accumulate in the needle valve, thereby impeding the air flow and causing the adjustment of the dwell to vary.

Still further, in some instances, if the dwell and automatic retraction mechanism is set for a relatively short dwell, the cutter may be retracted by the retraction mechanism before the feed portion of the feed cycle is fully completed. That is, the feed force generated by the feed mechanism, which is the force that generally feeds the cutter, may not have sufficient dwell time to be transferred to the depth stop at the feed limit before the cutter is retracted. Thus, the cutter may be retracted prematurely, thereby possibly resulting in a shallow countersink in the workpiece.

Thus, there exists a need for pneumatic power feed equipment, particularly equipment used in drilling and or countersinking processes in a manufacturing operation, having a controllable dwell that is both adjustable and consistent between drilling and or countersinking processes. Such a dwell mechanism should desirably be substantially independent of the retraction mechanism and relatively insensitive to fluctuations in the pressure of the air supply as well as to the condition and or purity of the air provided by the air supply. The dwell mechanism should also be configured such that the feed force is transferred to the depth stop before the retraction mechanism can be actuated to reduce the possibility of shallow countersinks.

SUMMARY OF THE INVENTION

The above and other needs are met by the present invention which, in one embodiment, provides an apparatus having a controllable dwell for drilling and or countersinking a hole in a workpiece. The apparatus generally comprises a feed mechanism, a retraction mechanism, and a dwell mechanism. The feed mechanism is configured to feed a spindle from a starting position to a predetermined feed limit during a feed cycle. The retraction mechanism is configured to retract the spindle from the feed limit to the starting position to complete the feed cycle. The dwell mechanism is in communication with the retraction mechanism and comprises a mechanical bias member that stores energy during at least a portion of the feed cycle, wherein the mechanical bias member releases at least a portion of the energy once the spindle reaches the feed limit. The retraction mechanism is only actuated once the spindle reaches the feed limit and the mechanical bias member releases at least a portion of the energy. A predetermined dwell period is thereby provided between the spindle reaching the feed limit and the retraction mechanism being actuated.

In some instances, the retraction mechanism is configured to be pneumatically controlled. The apparatus thus further comprises a pressurized air supply operably connected to the retraction mechanism and to a scalable vent port, wherein the vent port is sealed at least when the spindle is at the feed limit. Accordingly, the dwell mechanism may also be operably connected to the air supply intermediate the vent port and the retraction mechanism and may further comprise a mounting member, a hydraulically-actuated device, and an adjusting member.

The mounting member may define an exhaust port and a mounting port, wherein the exhaust port is in communication with the air supply. Accordingly, the hydraulically-actuated device comprises a housing with a reduced portion extending through and sideably disposed within the mounting port. The housing generally has a shoulder adjacent to the reduced portion, wherein the shoulder is capable of engaging and sealing the exhaust port in the mounting member. The device further includes a slidable piston member communicating with the feed mechanism and interacting with the housing such that the device is capable of adjustably dissipating a feed force applied thereto by the feed mechanism. To dissipate the feed force, the device slides with respect to the mounting port such that the shoulder is disengaged from the exhaust port as the feed force is dissipated. The adjusting member operably engages the reduced portion of the housing opposite the mounting member from the shoulder and the mechanical bias member is disposed intermediate the adjusting member and the mounting member. The mechanical bias member releases at least a portion of the stored energy by applying a restoration force which urges the shoulder to re-engage the exhaust port after the spindle has reached the feed limit and the feed force has been dissipated. The retraction mechanism is then actuated when the exhaust port is resealed.

Generally, the adjusting member cooperates with the mechanical bias member to adjust the restoration force. More particularly, the mechanical bias member may comprise a Belleville washer and the adjusting member may comprise an adjusting nut threadedly engaged with the reduced portion of the housing. The adjusting nut thereby cooperates with the Belleville washer such that increased compression of the Belleville washer by the adjusting nut increases the restoration force and thereby reduces the dwell period. In some instances, the apparatus may comprise a depth stop mechanism operably connected to the feed mechanism for controlling the feed limit. The apparatus may further comprise, for example, a pneumatic drill having a drill motor for rotating the spindle, wherein the spindle is further adapted to engage a cutter. The cutter is typically capable of drilling and or countersinking a hole in a workpiece.

In one particularly advantageous embodiment, an apparatus having a controllable dwell for drilling and or countersinking a hole in a workpiece comprises a spindle, a plate defining a bore, a feed mechanism operably engaging the plate, an air supply in communication with the feed mechanism, a retraction mechanism, and a dwell mechanism. The feed mechanism is configured to feed the spindle through the bore to an adjustable predetermined feed limit during a feed cycle. The air supply supplies pressurized air to a vent port through a supply line, wherein the vent port is sealed at least when the spindle is at the feed limit. The retraction mechanism is in communication with the supply line and is capable of retracting the spindle.

The dwell mechanism is in communication with the supply line intermediate the vent port and the retraction mechanism and generally comprises a mechanical bias member, a mounting member, a hydraulically-actuated device, and an adjusting member. The mechanical bias member stores energy during at least a portion of the feed cycle and releases at least a portion of the energy once the spindle reaches the feed limit. The retraction mechanism is only actuated once the spindle reaches the feed limit and the mechanical bias member releases at least a portion of the energy. A predetermined dwell period is thereby provided between the spindle reaching the feed limit and the retraction mechanism being actuated.

The mounting member defines an exhaust port and a mounting port, wherein the exhaust port is in communication with the air supply. The hydraulically-actuated device comprises a housing having a reduced portion extending through and slidably disposed within the mounting port. The housing further has a shoulder adjacent to the reduced portion which is capable of engaging and sealing the exhaust port. The device further includes a slidable piston member communicating with the feed mechanism and interacting with the housing such that the device is capable of adjustably dissipating a feed force applied thereto by the feed mechanism. The device dissipates the feed force by sliding with the respect to the mounting port such that the shoulder is disengaged from the exhaust port as the feed force is dissipated. The adjusting member operably engages the reduced portion of the housing opposite the mounting member from the shoulder. The mechanical bias member is disposed intermediate the adjusting member and the mounting member and releases at least a portion of the stored energy by applying a restoration force which urges the shoulder to re-engage the exhaust port after the spindle has reached the feed limit and the feed force has been dissipated. The retraction mechanism is then actuated when the exhaust port is resealed.

A further advantageous aspect of the present invention comprises a method of providing a dwell period in an apparatus. Generally, a spindle is fed axially from a starting position to a predetermined feed limit during a feed cycle. During at least a portion of the feed cycle, energy is stored in a mechanical bias member. The spindle is then maintained at the feed limit for a predetermined dwell period, where at least a portion of the stored energy is released from the mechanical bias member once the spindle reaches the feed limit. The spindle is then retracted from the feed limit to the starting position once the mechanical bias member releases at least a portion of the stored energy. In some instances, the method may further comprise actuating a feed mechanism before feeding the spindle. Also, in some instances, a feed force may be generated with the feed mechanism as the feed mechanism feeds the spindle toward the feed limit, wherein the feed force may be dissipated with a hydraulically-actuated device. As the device dissipates the feed force, it is disengaged from an exhaust port defined by a mounting member to thereby unseal the exhaust port. The feed mechanism is then stopped by a depth stop mechanism once the spindle has reached the feed limit, thereby discontinuing generation of the feed force. As the spindle is maintained at the feed limit, the device is urged back into a sealing engagement with the exhaust port, after the feed mechanism has been stopped by the depth stop mechanism, such that the device reseals the exhaust port after the feed force is dissipated and the mechanical bias member has released at least a portion of the stored energy. The spindle is then retracted after the device has resealed the exhaust port.

Thus, a drilling apparatus having a controllable dwell according to embodiments of the present invention is capable of providing a controllable dwell that is both adjustable and consistent between drilling and or countersinking processes in a manufacturing operation. Since the dwell mechanism is mechanically implemented with the mechanical bias device, such as a Belleville washer, a more repeatable and adjustable dwell mechanism is provided that is substantially unaffected by the characteristics of the retraction mechanism, moisture or particulates in the air supply, or the pressure of the air supply. Since no needle valve is necessary in the dwell mechanism according to embodiments of the present invention, there are no minute restrictions between the air supply and the vent port which would be susceptible to contaminants in the air supply. In addition, the retraction mechanism is not actuated until the feed force has been transferred to the depth stop mechanism, thereby preventing premature actuation of the retraction mechanism which causes shallow countersinks. The dwell mechanism according to embodiments of the present invention therefore provides a more consistent and controllable dwell as compared to the prior art.

BRIEF DESCRIPTION OF THE DRAWINGS

Some of the advantages of the present invention having been stated, others will appear as the description proceeds, when considered in conjunction with the accompanying drawings, which are not necessarily drawn to scale, in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
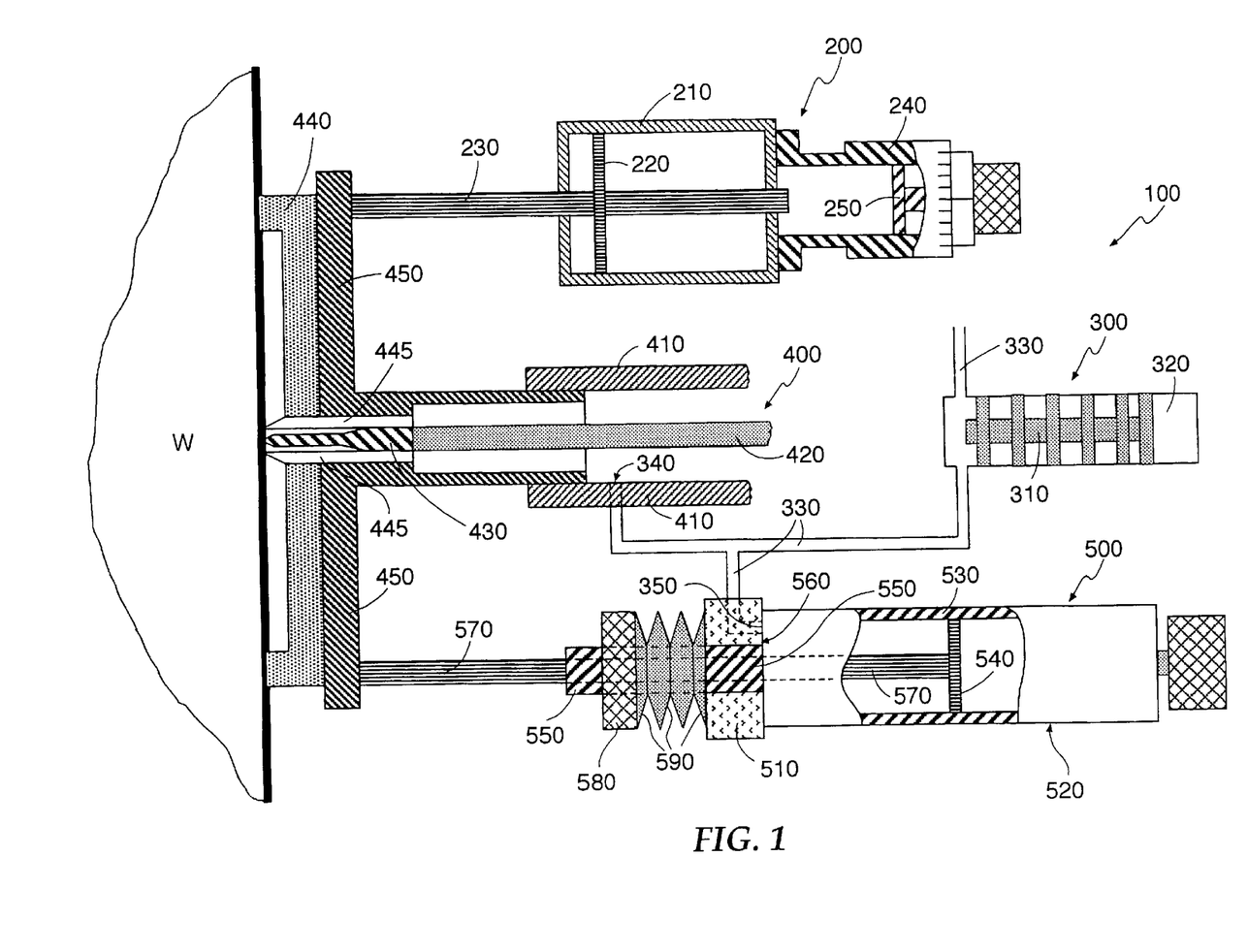
FIG. 1 is a cross-sectional schematic of a pneumatic power feed drilling apparatus according to one embodiment of the present invention showing the cutter in the fully retracted position at the start of the feed cycle.

FIG. 1 discloses one embodiment of a drilling apparatus having a controllable dwell in accordance with the present invention, the drilling apparatus indicated generally by the numeral 100. The drilling apparatus 100 may be pneumatically powered and generally comprises a feed mechanism 200, a retraction mechanism 300, a pneumatic drill 400, and a dwell mechanism 500 which cooperate to drill and or countersink holes in a workpiece W. The drill motor includes a drill housing 410 through which extends a spindle 420 that is rotated by the drill motor 400. Engaging the free end of the spindle 420 is a cutter 430, for example, a drill bit, a countersink bit, or a drill/countersink bit, for producing a hole in the workpiece W. The drilling apparatus 100 is configured such that the cutter 430 extends through a drill plate 440 to interact with the workpiece W. The drill plate 440 interacts with the drill housing 410 via a feed slide 450 which slidably engages the drill housing 410 such that the drill housing 410 may move relative to the drill plate 440. Thus, in order to drill and or countersink a hole in the workpiece W, the cutter 430 extends from the drill housing 410, through the feed slide 450, and through the drill plate 440. The drill plate 440 typically abuts the surface of the workpiece W in which the hole is to be formed and may, for example, be arranged perpendicularly to the cutter 430, at an angle with respect thereto, may conform to the contours of the workpiece W, or may include alignment provisions for interacting with the workpiece W to form the hole in the desired location. In some instances, a drill bushing 445 threadedly engages the feed slide 450 for supporting and guiding the cutter 430. The drill bushing 445 protrudes from the feed slide 450 to engage a close tolerance hole in the drill plate 440. The engagement of the drill bushing 445 with the drill plate 445 with the drill plate 440 thus locates the drill motor 400 and the cutter 430 to drill/countersink the hole in the desired location in the workpiece W. The drill plate 440 and the feed slide 450 are configured such that, as the drill housing 410 is moved toward the drill plate 440, the cutter 430 protrudes outwardly of the drill bushing 445 from the drill housing 410. The distance that the cutter 430 is able to protrude outwardly of the drill housing 445 determines the depth of the hole in the workpiece W. The depth of the hole thus typically corresponds to the length of travel of the feed portion of the feed cycle.

The feed mechanism 200 is particularly adapted to control the movement of the drill housing 410 with respect to the drill plate 440. The feed mechanism includes a piston housing 210 that is generally fixed with respect to the drill housing 410. Slidably disposed within the piston housing 210 is a feed piston 220. The feed piston 220 further engages a feed rod 230 that extends through the piston housing 210 to engage the feed slide 450. Generally, the feed mechanism 200 is configured such that the feed piston 220 may be, for example, hydraulically or pneumatically urged to slide within the piston housing 210 away from the workpiece W, which thereby draws the feed slide 450 toward the drill housing 410 via the feed rod 230 and provides a power feed for the drilling apparatus 100. The feed mechanism 200 further includes a depth stop mechanism 240. The depth stop mechanism 240 interacts with the piston housing 210 to limit the travel of the feed piston 220 and thereby control the depth to which the cutter 430 extends into the workpiece W. In some instances, the depth stop mechanism 240 includes a stop 250 which is adjustable in fine increments such as, for example, of 0.001 inches. The stop 250 is disposed within the path of motion of the feed piston 220 and/or the feed rod 230 to provide physical impedance to the motion of the feed piston 220 and to positively limit the distance to which the cutter 430 protrudes from the drill slide 450, thereby defining a feed limit for the cutter 430.

The dwell mechanism 500 serves to provide a delay or a dwell period after the cutter 430 has been fed by the feed mechanism 200 to the feed limit and before the retraction mechanism 300 is actuated. The dwell mechanism 500 is also configured to provide a resistance force opposing a feed force generated by the feed mechanism 200 as the feed piston 220 is fed within the piston housing 210 toward the stop 250 such that the feed rate of the feed mechanism 200 is more controllable. The dwell mechanism 500 comprises a mounting member 510 that is fixed with respect to the drill housing 410. The dwell mechanism 500 further comprises a hydraulically-actuated device 520 such as, for example, a hydraulic cylinder or other hydraulic feed control device, having a housing 530 with a piston 540 disposed therein and slidably engaged therewith. The hydraulically-actuated device 520 provides an adjustable damping force and serves to dissipate at least a portion of the feed force exerted by the feed mechanism 200. The housing 530 further includes a reduced portion 550 which extends through and slidably engages the mounting member 510. Adjacent to the reduced portion 550 is a shoulder 560 configured to engage the mounting member 510. The dwell mechanism 500 further includes a dwell rod 570 engaging the piston 540 and extending through the reduced portion 550 of the housing 530 to engage the feed slide 450. Accordingly, as the drill housing 410 is fed by the feed mechanism 200, the feed force generated by the feed mechanism 200 also acts on the dwell rod 570 and, since a resistive force is exerted by the hydraulically-actuated device 520 against the piston 540, the feed force will tend to force the reduced portion 550 to slide with respect to the mounting member 510 such that the shoulder 560 disengages the mounting member 510. Thus, the housing 530 further includes an adjusting member 580 engaging the reduced portion 550 on the side of the mounting member 510 opposite the shoulder 560. The adjusting member 580 may be, for example, threadedly engaged with the reduced portion 550 and may therefore be adjusted with respect to the reduced portion 550 to limit the distance that the reduced portion may slide through the mounting member 510.

The retraction mechanism 300 may comprise, for example, a pneumatically-actuated spool valve which includes a spool 310 housed within a bore 320. Such a spool valve retraction mechanism 300 is typically actuated by a threshold air pressure which causes the spool 310 to shift within the bore 320, thereby causing the feed mechanism 200 to reverse and retract the cutter 430 back through the drill bushing 445. The air necessary to operate the retraction mechanism 300 is supplied from an air supply (not shown) through a conduit 330. According to embodiments of the present invention, the conduit 330 extends from the air supply (not shown) to the retraction mechanism 300 and from the retraction mechanism 300 to the drill housing 410. The conduit 330 ends in a vent port 340 within the drill housing 410. The vent port 340 is configured and disposed such that, as the feed slide 450 slides into the drill housing 410 as the drill housing 410 is fed by the feed mechanism 200, the feed slide 450 will engage and seal the vent port 340 during the feed portion of the feed cycle.

Ordinarily, as in the prior art, sealing of the vent port 340 would result in the build up of back-pressure within the conduit 330 that would shift the spool 310 within the bore 320 upon the back-pressure attaining a threshold pressure. However, a dwell period would not be provided between the cessation of the feed portion of the feed cycle and the actuation of the retraction portion of the feed cycle. Thus, the conduit 330 further extends from a location intermediate the drill housing 410 and the retraction mechanism 300 through the mounting member 510, ending in an exhaust port 350. The exhaust port 350 is configured such that, when the shoulder 560 is engaged with the mounting member 510, the exhaust port 350 is sealed. As previously described, the reduced portion 550 of the housing 530 is configured to slide with respect to the mounting member 510 such that the shoulder 560 will disengage the mounting member 510 as the hydraulically-actuated device 520 is dissipating a portion of the feed force as the feed mechanism 200 is feeding the cutter 430. The vent port 340 and the exhaust port 350 are thereby configured such that, as the vent port 340 is sealed by the feed slide 450, the shoulder 560 is disengaging the mounting member 510 such that the air in the conduit 330 will be exhausted through the exhaust port 350. Since the air from the conduit 330 is continuously being released from the conduit 330, the retraction mechanism 300 is not actuated.

The dwell period provided by the drilling apparatus 100 according to embodiments of the present invention is thus accomplished by placing at least one mechanical bias device 590 intermediate the adjusting member 580 and the mounting member 510. The mechanical bias member 590 may comprise, for example, a Belleville washer, a coil spring, or other bias member providing an elastic restorative force after being compressed. As previously described, the reduced portion 550 slides with respect to the mounting member 510 as the feed mechanism 200 is feeding the cutter 430, thereby disengaging the shoulder 560 from the mounting member 510 and allowing air to flow from the air supply through the exhaust port 350. Venting the air from the conduit 330 prevents the actuation of the retraction mechanism 300 which requires a back-pressure threshold to be attained before being actuated. At the end of the feed cycle, the feed piston 220 and or the feed rod 230 are prevented from further feeding the cutter 430 by the stop 250. The feed force generated by the feed mechanism 200 is thereby transferred to the stop 250. Thus, at the cutter feed limit, the feed force is no longer being dissipated by the hydraulically-actuated device 520. At this point, the mechanical bias member 590 exerts a restorative force between the mounting member 510 and the adjusting member 580 to bring the shoulder 560 back into a sealing engagement with the mounting member 510 such that the exhaust port 350 is also sealed. When the shoulder 560 re-engages and seals the exhaust port 350, air from the air supply can no longer escape the conduit 330 and thus causes back-pressure to build up within the conduit 330. At some point, the back-pressure attains a threshold value which causes the spool 310 to shift within the bore 320 and to reverse the feed mechanism 200 such that the cutter 430 is retracted through the drill bushing 445.

According to a particularly advantageous embodiment, the mechanical bias member 590 is chosen such that it exerts a restorative force that allows the shoulder 560 to disengage the exhaust port as the cutter 430 is being fed, wherein the restorative force is also sufficient to urge the shoulder 560 to re-engage the exhaust port 350 after the feed mechanism 200 has reached the feed limit. Thus, the period between the feed piston 220 and or the feed rod 230 being stopped by the stop 250 and the shoulder 560 sealingly re-engaging the exhaust port 350 is the dwell period between the feed portion and the retract portion of the feed cycle. The dwell period may be adjusted using the adjusting member 580 where, for example, the more the mechanical bias member 590 is compressed between the mounting member 510 and the adjusting member 580, the smaller will be the dwell period.

Figure 2:
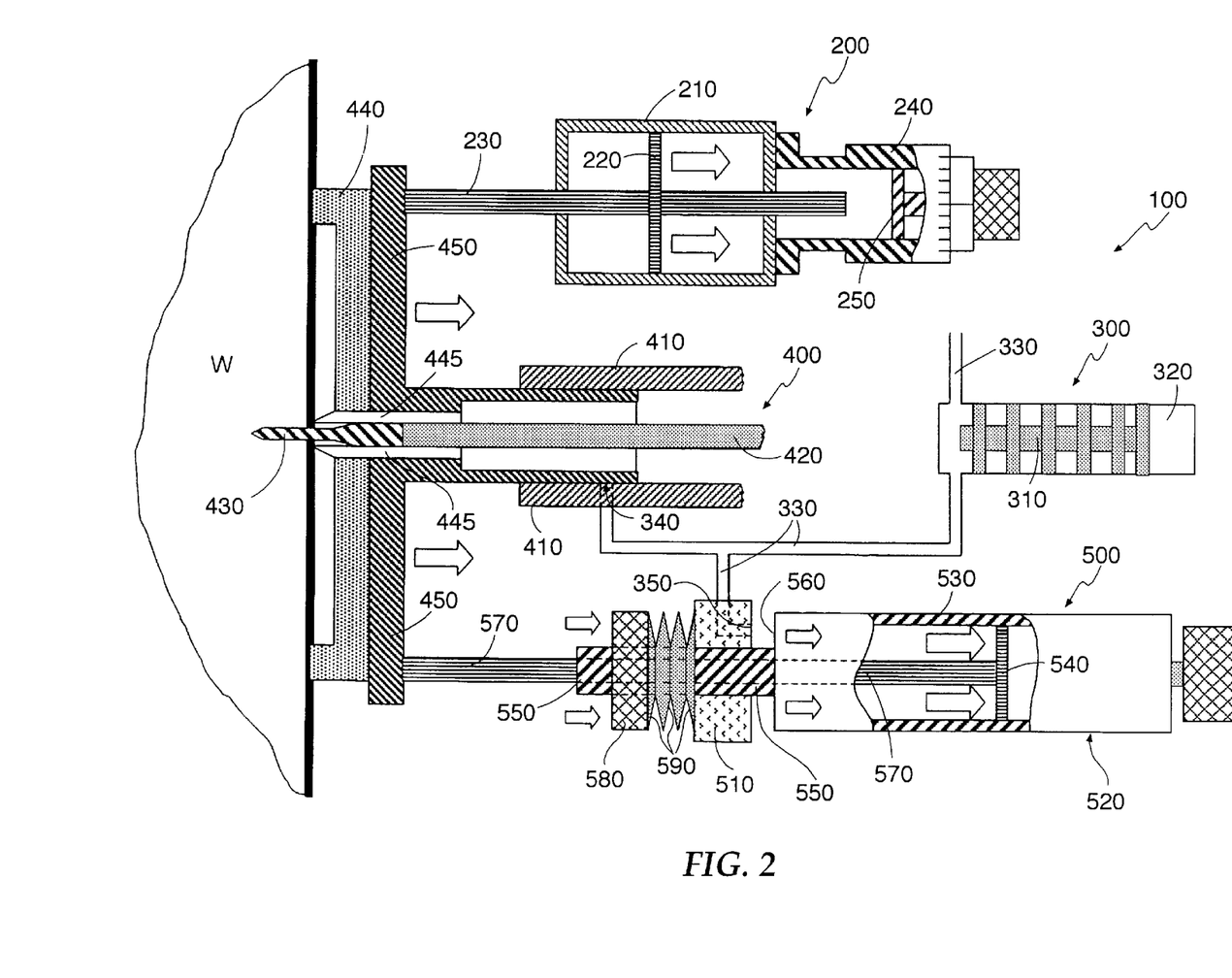
FIG. 2 is a cross-sectional schematic of a pneumatic power feed drilling apparatus according to one embodiment of the present invention showing the cutter being fed toward the feed limit during the feed portion of the feed cycle.

The sequence of operations of the drilling apparatus 100 is shown in FIGS. 1–5 for the configuration previously described. The drilling apparatus 100 is shown in FIG. 1 at the beginning of the feed portion of the feed cycle (or the end of the retract portion of the feed cycle) where the cutter 430 is retracted into the drill housing 445 and the vent port 340 is unobstructed. FIG. 2 shows the drilling apparatus 100 at a point during the feed portion of the feed cycle. As shown, the feed piston 220 and the feed rod 230 are urged toward the stop 250, thereby urging the drill housing 410 in the opposite direction and causing the cutter 430 to protrude outwardly of the drill bushing 445 into the workpiece W. At the same time, the hydraulically-actuated device 520 is dissipating a portion of the feed force through the dwell rod 570 which causes the reduced portion 550 to slide through the mounting member 510 and thus disengage the shoulder 560 from the exhaust port 350 as the vent port 340 is sealed by the feed slide 450. The urging of the reduced portion 550 through the mounting member 510 further causes the mechanical bias member 590 to be compressed between the mounting member 510 and the adjusting member 580.

Figure 3:
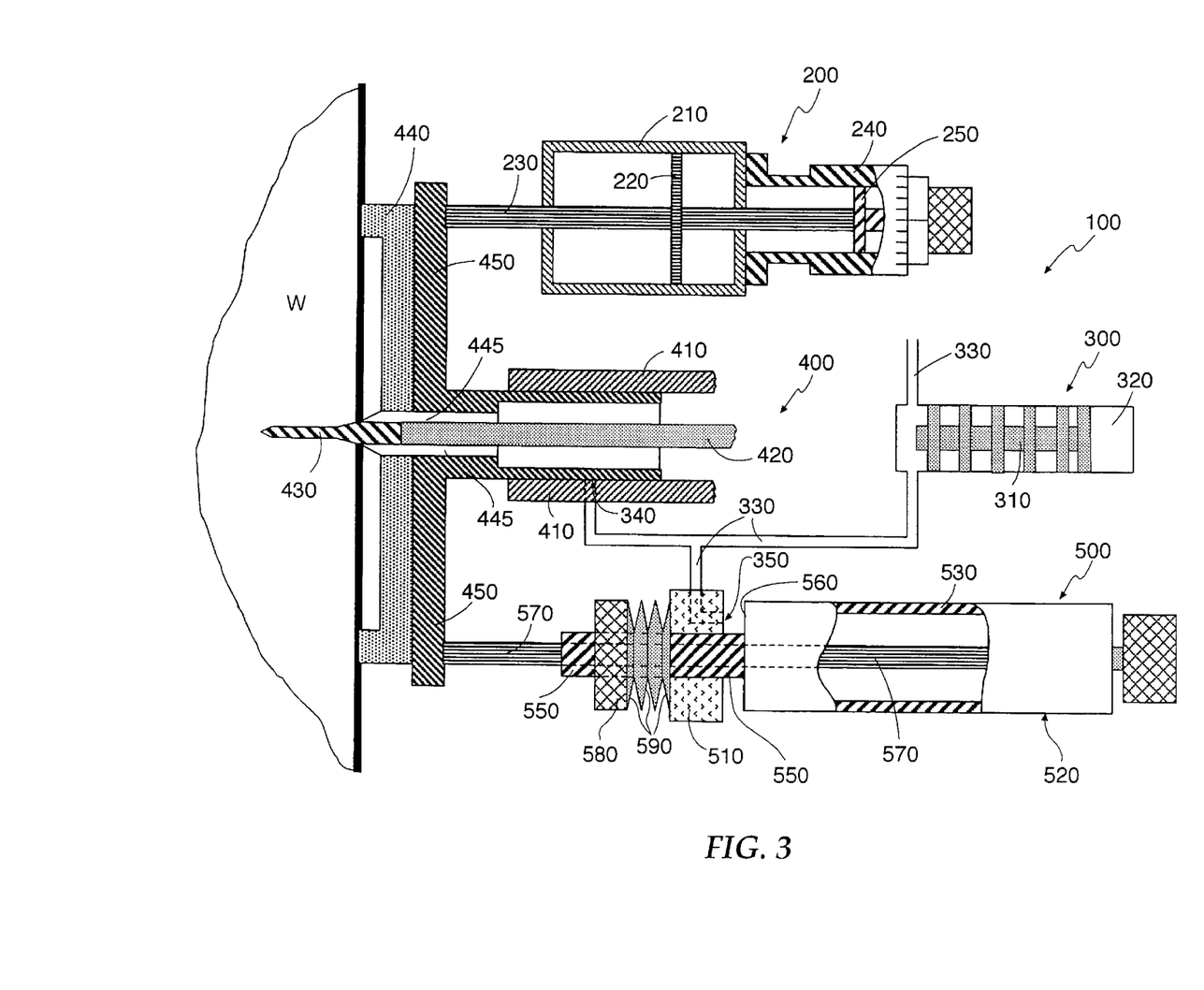
FIG. 3 is a cross-sectional schematic of a pneumatic power feed drilling apparatus according to one embodiment of the present invention showing the cutter at the feed limit with the feed force transferred to the depth stop and the dwell mechanism actuated.
Figure 4:
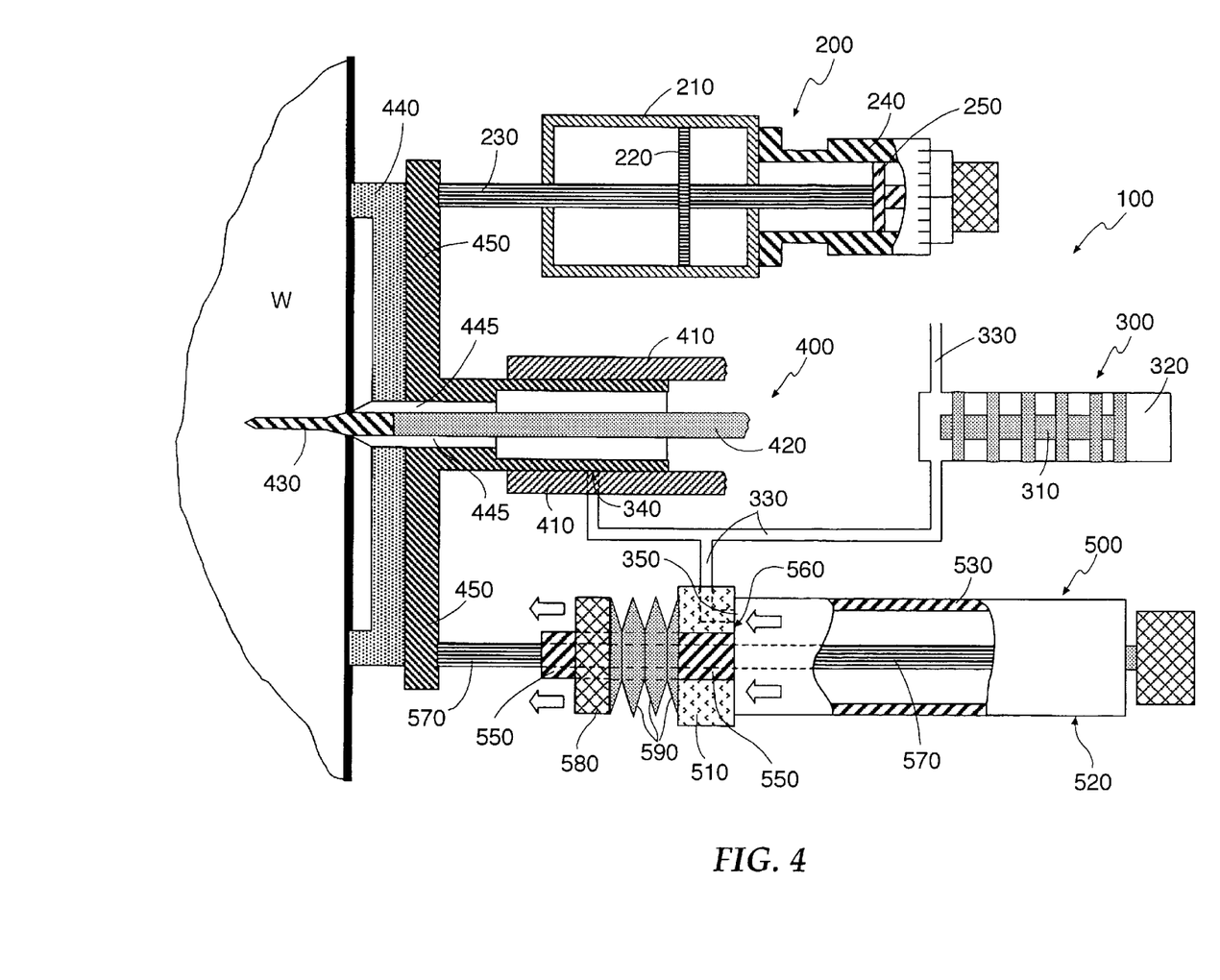
FIG. 4 is a cross-sectional schematic of a pneumatic power feed drilling apparatus according to one embodiment of the present invention showing the dwell mechanism actuating the retraction mechanism following the dwell period.
Figure 5:
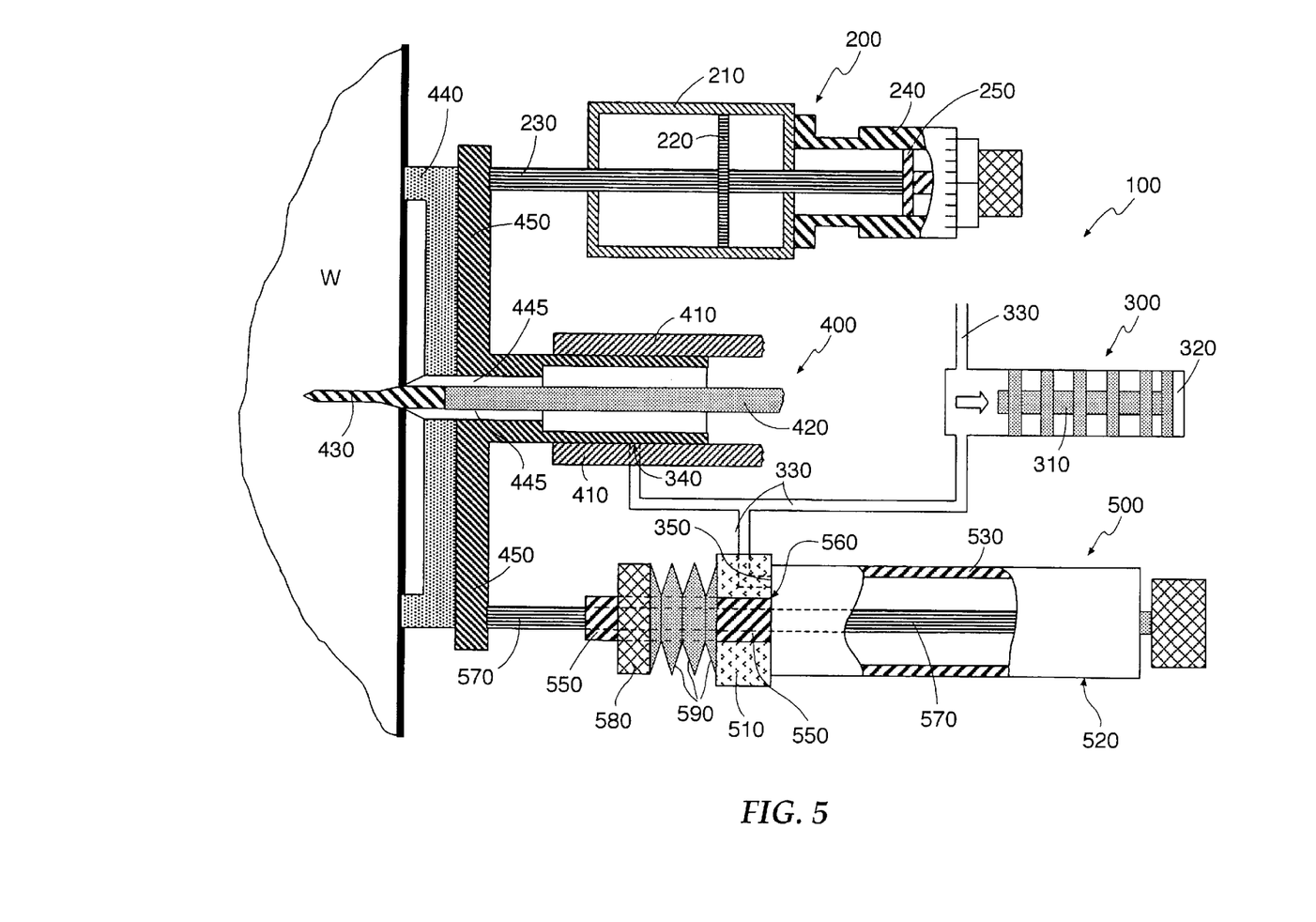
FIG. 5 is a cross-sectional schematic of a pneumatic power feed drilling apparatus according to one embodiment of the present invention showing the retraction mechanism spool valve shifted to retract the cutter from the feed limit.

FIG. 3 shows the feed mechanism 200 at the end of the feed portion of the feed cycle, wherein the feed rod 230 engages the stop 250, thus transferring the feed force to the stop 250. At this point, the cutter 430 is protruding for the predetermined maximum distance outwardly of the drill bushing 445 into the workpiece W. The vent port 340 is sealed by the feed slide 450, but the exhaust port 350 is disengaged from the shoulder 560. The mechanical bias member 590 also remains compressed between the mounting member 510 and the adjusting member 580. When the feed force has been transferred to the stop 250, the mechanical bias member 590 exerts a restorative force between the mounting member 510 and the adjusting member 580 which urges the shoulder 560 of the housing 530 back into sealing engagement with the exhaust port 350 in the mounting member 510. Once both the vent port 340 and the exhaust port 350 are sealed, the air within the conduit 330 increases in pressure toward the pressure of the air provided by the air supply. As shown in FIG. 5, once the back-pressure within the conduit 330 attains a threshold pressure, the retraction mechanism 300 is actuated such that the retract spool 310 shifts within the bore 320 to reverse the feed mechanism and retract the cutter 430 back through the drill bushing 445 such that the drilling apparatus 100 returns to the configuration as shown in FIG. 1.

Thus, the drilling apparatus according to embodiments of the present invention provides a pneumatic power feed device for drilling and or countersinking holes in a workpiece having a controllable dwell between the feed portion and the retract portion of the feed cycle. The dwell of the drilling apparatus is dependent upon the mechanical action of a mechanical bias device opposing a hydraulically-actuated device to seal a vent and actuate the retraction mechanism. Thus, the dwell of the drilling apparatus is substantially unaffected by the characteristics of the retraction mechanism, moisture or particulates in the air supply, or the pressure of the air provided by the air supply as prior art devices incorporating a needle valve mechanism for attaining dwell. In addition, the retraction mechanism cannot be actuated until the feed force has been transferred to a depth stop. Thus, the retraction mechanism cannot be prematurely actuated, thereby reducing the possibility of shallow countersinks. Therefore, the drilling apparatus according to embodiments of the present invention provides a drilling apparatus with a mechanical dwell that is more consistent and adjustable than prior art dwell mechanisms employing pneumatic systems dependent upon the air supply for providing the necessary dwell for a drilling and or countersinking device.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus having a controllable dwell, comprising:
    a feed mechanism configured to feed a spindle from a starting position to a predetermined feed limit during a feed cycle;
    a retraction mechanism configured to retract the spindle from the feed limit to the starting position; and
    a dwell mechanism in communication with the retraction mechanism, the dwell mechanism comprising a mechanical bias member that stores energy during at least a portion of the feed cycle and that releases at least a portion of the energy once the spindle reaches the feed limit, wherein the retraction mechanism is only actuated once the spindle reaches the feed limit and the mechanical bias member releases at least a portion of the energy to thereby provide a predetermined dwell period between the spindle reaching the feed limit and the retraction mechanism being actuated.

2. An apparatus according to claim 1 wherein the retraction mechanism is configured to be pneumatically controlled.

3. An apparatus according to claim 2 further comprising a pressurized air supply operably connected to the retraction mechanism and to a sealable vent port, the vent port being sealed at least when the spindle is at the feed limit.

4. An apparatus according to claim 3 wherein the dwell mechanism is operably connected to the air supply intermediate the vent port and the retraction mechanism.

5. An apparatus according to claim 4 wherein the dwell mechanism further comprises:
    a mounting member defining an exhaust port and a mounting port, the exhaust port being in communication with the air supply;
    a hydraulically-actuated device having a housing with a reduced portion extending through and slidably disposed within the mounting port, the housing having a shoulder adjacent to the reduced portion capable of engaging and sealing the exhaust port, the device further including a slidable piston member communicating with the feed mechanism and interacting with the housing such that the device is capable of adjustably dissipating a feed force applied thereto by the feed mechanism by sliding with respect to the mounting port such that the shoulder is disengaged from the exhaust port as the feed force is dissipated; and an adjusting member operably engaging the reduced portion of the housing opposite the mounting member from the shoulder, wherein the mechanical bias member is disposed intermediate the adjusting member and the mounting member and releases at least a portion of the stored energy by applying a restoration force which urges the shoulder to re-engage the exhaust port after the spindle has reached the feed limit and the feed force has been dissipated, wherein the retraction mechanism is actuated when the exhaust port is resealed.

6. An apparatus according to claim 5 wherein the adjusting member cooperates with the mechanical bias member to adjust the restoration force.

7. An apparatus according to claim 6 wherein the mechanical bias member comprises a Belleville washer and the adjusting member comprises an adjusting nut threadedly engaged with the reduced portion of the housing, the adjusting nut cooperating with the Belleville washer such that increased compression of the Belleville washer increases the restoration force and thereby reduces the dwell period.

8. An apparatus according to claim 7 further comprising a depth stop mechanism operably connected to the feed mechanism for controlling the feed limit.

9. An apparatus according to claim 1 wherein the apparatus comprises a pneumatic drill having a drill motor for rotating the spindle, the spindle further being adapted to engage a cutter for at least one of drilling a hole and countersinking a hole in a workpiece.

10. An apparatus having a controllable dwell, comprising:
a spindle;
a plate defining a bore;
a feed mechanism operably engaging the plate and configured to feed the spindle through the bore to an adjustable predetermined feed limit during a feed cycle;
an air supply in communication with the feed mechanism and supplying pressurized air to a vent port through a supply line, the vent port being sealed at least when the spindle is at the feed limit;
a retraction mechanism in communication with the supply line and capable of retracting the spindle; and
a dwell mechanism in communication with the supply line intermediate the vent port and the retraction mechanism, comprising:
a mechanical bias member that stores energy during at least a portion of the feed cycle and that releases at least a portion of the energy once the spindle reaches the feed limit, wherein the retraction mechanism is only actuated once the spindle reaches the feed limit and the mechanical bias member releases at least a portion of the energy to thereby provide a predetermined dwell period between the spindle reaching the feed limit and the retraction mechanism being actuated;
a mounting member defining an exhaust port and a mounting port, the exhaust port being in communication with the air supply;
a hydraulically-actuated device having a housing with a reduced portion extending through and slidably disposed within the mounting port, the housing having a shoulder adjacent to the reduced portion capable of engaging and sealing the exhaust port, the device further including a slidable piston member communicating with the feed mechanism and interacting with the housing such that the device is capable of adjustably dissipating a feed force applied thereto by the feed mechanism by sliding with respect to the mounting port such that the shoulder is disengaged from the exhaust port as the feed force is dissipated; and an adjusting member operably engaging the reduced portion of the housing opposite the mounting member from the shoulder, wherein the mechanical bias member is disposed intermediate the adjusting member and the mounting member and releases at least a portion of the stored energy by applying a restoration force which urges the shoulder to re-engage the exhaust port after the spindle has reached the feed limit and the feed force has been dissipated, wherein the retraction mechanism is actuated when the exhaust port is resealed.

11. An apparatus according to claim 10 wherein the adjusting member cooperates with the mechanical bias member to adjust the restoration force.

12. An apparatus according to claim 10 wherein the apparatus comprises a pneumatic drill having a drill motor for rotating the spindle, the spindle being adapted to engage a cutter for at least one of drilling a hole and countersinking a hole in a workpiece.

13. An apparatus according to claim 10 wherein the mechanical bias member comprises a Belleville washer and the adjusting member comprises an adjusting nut threadedly engaged with the reduced portion of the housing, the adjusting nut cooperating with the Belleville washer such that increased compression of the Belleville washer increases the restoration force and thereby reduces the dwell period.

14. An apparatus according to claim 10 further comprising a depth stop mechanism operably connected to the feed mechanism for controlling the feed limit.

15. A method of providing a dwell period during a drilling operation, comprising:
feeding a spindle axially from a starting position to a predetermined feed limit during a feed cycle;
storing energy in a mechanical bias member during at least a portion of the feed cycle;
maintaining the spindle at the feed limit for a predetermined dwell period, maintaining the spindle further comprising releasing at least a portion of the stored energy from the mechanical bias member once the spindle reaches the feed limit; and
retracting the spindle from the feed limit to the starting position once the mechanical bias member releases at least a portion of the stored energy.

16. A method according to claim 15 further comprising actuating a feed mechanism before feeding the spindle.

17. A method according to claim 15 wherein feeding the spindle further comprises generating a feed force with the feed mechanism as the feed mechanism feeds the spindle toward the feed limit.

18. A method according to claim 17 wherein feeding the spindle further comprises dissipating the feed force with a hydraulically-actuated device.

19. A method according to claim 18 further comprising disengaging the device from an exhaust port defined by a mounting member to thereby unseal the exhaust port as the device is dissipating the feed force.

20. A method according to claim 19 further comprising stopping the feed mechanism with a depth stop mechanism once the spindle has reached the feed limit to thereby discontinue generation of the feed force.

21. A method according to claim 20 wherein maintaining the spindle at the feed limit further comprises urging the device back into sealing engagement with the exhaust port after stopping the feed mechanism such that the device reseals the exhaust port after the feed force is dissipated and the mechanical bias member has released at least a portion of the stored energy.

22. A method according to claim 21 wherein retracting the spindle further comprises retracting the spindle after the device has resealed the exhaust port.

* * * * *